United States Patent [19]

Syeda-Mahmood

[11] Patent Number: 5,845,288
[45] Date of Patent: Dec. 1, 1998

[54] AUTOMATED SYSTEM FOR INDEXING GRAPHICAL DOCUMENTS HAVING ASSOCIATED TEXT LABELS

[75] Inventor: Tanveer F. Syeda-Mahmood, Rochester, N.Y.

[73] Assignee: Xerox Corporation, Stamford, Conn.

[21] Appl. No.: 570,022

[22] Filed: Dec. 11, 1995

[51] Int. Cl.[6] .................................................. G06F 17/30
[52] U.S. Cl. ............................... 707/102; 707/3; 707/104
[58] Field of Search .................................... 395/613, 615, 395/611, 603, 777, 762, 773, 133; 707/3, 100, 102, 104, 502, 512–515; 382/176, 180

[56] References Cited

U.S. PATENT DOCUMENTS

| | | | |
|---|---|---|---|
| 5,404,435 | 4/1995 | Rosenbaum | 395/777 |
| 5,444,840 | 8/1995 | Froessl | 395/602 |
| 5,465,353 | 11/1995 | Hull et al. | 395/605 |
| 5,579,471 | 11/1996 | Barber et al. | 395/326 |
| 5,640,553 | 6/1997 | Schultz | 395/605 |
| 5,647,058 | 7/1997 | Agrawal et al. | 395/601 |

OTHER PUBLICATIONS

Heck, M. et al., "Optical Character Recognition Software for Windows," InfoWorld, v. 15, N. 17 (Apr. 26, 1993), pp. 70–86.

Safi, Q. R., "Watermark Offers Entry–Level Imaging," PC Week, v.10, N.22 (Jun. 7, 1993), p. 87.

Stern, R., "OCR Alone Can't Address All Document Processing Needs," Computer Technology Review Supplement, Winter/Spring 1994, pp. 14–17.

Tribute, A., "Iota's Newsware: Revolutionary Archive and Retrieval System," Seybold Report on Publishing Systems, v.24, N. 11, (Feb. 13, 1995), pp. 3–13.

Wilson, W. J. et al., "Compound Documents Meet Workflow: at Work in an Image–Enabled World," Advanced Imaging, v.10, N.3 (Mar., 1995), pp. 44–48.

Anonymous, "The Recognition Factor," InfoWorld, v.17, N.10 (Mar. 6, 1995), pp. 64–81.

Karve, "Xsoft provides total document recall", LAN Magazine, 9:176, Aug. 1994.

"BRS introduces windows tookit", DBMS, Jan. 1994.

"Documentum enterprise document management system", The Workgroup Computing Report Seybold Group, Aug. 1994.

(List continued on next page.)

Primary Examiner—Maria N. Von Buhr

[57] ABSTRACT

A system for image indexing for the domain of technical manual documents depicting line drawing images of physical equipment. Such line drawings are often associated with text labels that indicate references to component parts in an associated table. The indexing system locates regions containing a machine part in relevant pages of the manual in response to a query describing the part. The query supplied by the user is a textual description of the machine part from which an associated geometric description of the object is retrieved. The indexing mechanism includes two stages, i.e., selection and recognition. The selection phase involves isolating relevant images from the document database using a combination to textual and visual processing and indicating the appropriate regions within those images that are likely to contain the queried machine part. Model-based object recognition then confirms the presence of the part at that location by finding a match of features between the part and the model using a 3D model description associated with the textual query.

16 Claims, 9 Drawing Sheets

OTHER PUBLICATIONS

Zurier, "Finding your way through imaging maze", Government Computer News, 13:6, Sep. 1994.

Haralick et al., "Understanding engineering drawings," Computer Vision, Graphics and Image Processing, 20:244–258, 1982.

Dori et al., "Sparse–pixel recognition of primitives in engineering drawings", Machine Vision and Applications, 6:69–82, Jun. 1993.

Fletcher et al., "A robust algorithm for text string separation from mixed text/graphics images", IEEE Transactions on Pattern Analysis and Machine Intelligence, 10:910–918, Nov. 1988.

Mackworth, "Interpreting pictures of polyhedral scenes", Artificial Intelligence, 4:121–137, 1973.

Waltz, D., "Understanding Line Drawings of Scenes With Shadows", The Psychology of Computer Vision, pp. 19–91, No Date.

Straforini et al., "The recovery and understanding of a line drawing from indoor scenes", IEEE Transactions on Pattern Analysis and Machine Intelligence, 14:298–303, Feb. 1992.

Malik, "Interpreting line drawings of curved objects", International Journal of Computer Vision, 1:73–103, 1987.

Hori et al., "Line drawing interpretation using probabilistic relaxation," Machine Vision and Applications, 6:100–109, Jun. 1993.

Kasturi et al., "A system for interpretation of line drawings", IEEE Transactions on Pattern Analysis and Machine Intelligence, 12:978–991, Oct. 1990.

Lorenz et al., "Retrieval of line drawings", Third Annual Symposium on Document Analysis and Information Retrieval, pp. 461–468, Apr. 1994.

Rothschild, D., "Dyslexic digital digger", Forbes, Oct. 1994, pp. 101–102.

Pentland et al., "Photobook: tools for content–based manipulation of image databases", IS & T International Symposium on Electronic Imaging: Conference 2185, Storage and Retrieval for Image and Video Databases, pp. 34–47, Feb. 1994.

Niblack et al., "The QBIC project: Querying images by content using color, texture, and shape", IS & T International Symposium on Electronic Imaging: Conference 1908, Storage and Retrieval for Image and Video Databases, pp. 173–187, Feb. 1993.

Swain, "Interactive indexing into image databases", IS & T International Symposium on Electronic Imaging: Conference 1908, Storage and Retrieval for Image and Video Databases, pp. 95–103, Feb. 1993.

"IBM Unleases QBIC Image–Content Search; Queries Images by Color, Texture, Shape", The Seybold Report on Desktop Publishing, Sep. 12, 1994, vol. 9, No. 1, p. 34.

Grimson et al., "Localizing Overlapping Parts by Searching the Interpretation Tree", IEEE Transactions on Pattern Analysis Machine and Intelligence, vol. 9, No. 4, Jul. 1987.

Pavlidis, Algorithms for Graphics and Image Processing, Rockville: Computer Science Press, 1982.

Ullman et al., "Recognition by linear combination of models", IEEE Transactions on Pattern Analysis and Machine Intelligence, pp. 992–1006, Oct. 1991.

D.P. Huttenlocher et al., "Comparing images using the hausdorff distance," IEEE Transactions on Pattern Analysis and Machine Intelligence, 9:850–863, Sep. 1993.

AUTOMATED SYSTEM FOR INDEXING GRAPHICAL DOCUMENTS HAVING ASSOCIATED TEXT LABELS

This invention relates generally to storage and retrieval of mixed graphic and text documents in document image databases, and more particularly to a method for indexing into graphical regions in documents based on text and graphical content in a query.

BACKGROUND OF THE INVENTION

A frequent operation in the maintenance and management of electronic document images is the retrieval of such documents based on content. Karve, "Xsoft provides total document recall". LAN Magazine, 9:176, August 1994; "BRS introduces windows tookit" DBMS, January 1994; "Documentum enterprise document management system", The Work-group Computing Report: Seybold Group, August, 1994. Current methods can retrieve text documents from a database based on their textual content. To retrieve non-text or documents depicting images, text tags are manually associated with the documents and the documents as a whole are retrieved based on textual queries. Zurier, "Finding your way through imaging maze" Government Computer News, 13:6, September 1994. In particular, when the documents contain graphical data, they are retrieved using manually generated annotating keywords. For example, the document shown in FIG. 1 could be annotated by the keywords: baffle, tie down bracket, or transport drive shaft, etc.

While key word information may be helpful in retrieving a graphical document as a whole, it can, however, be tedious to generate such descriptions manually, and may not completely anticipate all possible queried objects. Even if comprehensive lists of keywords could be automatically generated, perhaps by using optical character recognition methods for word detection, they would still be insufficient when the application requires queried graphical regions to be indicated within the document. Accordingly, in the document image shown in FIG. 1, even if the text query "bearing block" could be located, the mere knowledge that a graphical element exists in the document with that name, still does not give a good indication of the region containing this object without utilizing additional information in the graphical data.

Automatic indexing or isolation of element regions in response to queries is necessary for several applications that maintain graphical documents on-line. One such application arises in the building of diagnostic systems for complex systems such as airplanes, submarines, copiers, etc. Currently, a large number of technical manual documents describing the design of such systems as line drawing graphics, exist in paper form. Repair personnel examining these manuals for machine parts needing repair, find it difficult and time consuming to manually select the line drawing of the subassembly and the region within this subassembly that is affected by the part needing repair. A system that can automatically isolate such regions in response to queries about the objects would greatly facilitate the repair process. Similarly, when such graphical documents are maintained on-line for purposes of redesign of subsystems, queries may need regions containing specific objects to be outlined for replacing with a new design. This would again benefit from a system for automatically indexing the graphical data.

Automatically indexing into graphical data based on graphical queries is a difficult problem, because it requires retrieving the document based on image content. This requires quickly selecting the relevant document containing the graphical query as well as locating object-containing regions in the selected documents. In particular, line drawing graphics contain different types of lines, such as lines belonging to object contours, lines that interpret objects i.e., that label objects, and lines that interconnect or show containment relationships, as illustrated in the FIG. 1 image. Since the types of these lines is not clearly deducible, it is difficult to group such lines into single object containing regions as is required for automatic indexing. The presence of annotating text can help to a large extent in roughly isolating a starting region containing a queried object. Further region isolation would require information about the appearance of the object. To index into the contents of graphical documents, therefore, it appears that we need a method that can utilize the text and graphical information in the document as well as text and geometric information in the query. Little known work exists, however, on the indexing of graphical data using text and graphical information. Previous methods for analyzing graphical documents have mainly aimed for extracting the text and graphical entities in the drawing. For example, approaches had analyzed line drawings for purposes of interpretation, such as the recognition of dimensions and other primitives, extraction of text components, scene analysis and interpretation. See, Haralick et al., "Understanding engineering drawings" Computer Vision, Graphics and Image Processing, 20:244–258, 1982; Dori et al. "Sparse-pixel recognition of primitives in engineering drawings" Machine Vision and Applications, 6:69–82, June, 1993; Fletcher et al. "A robust algorithm for text string separation from mixed text/graphics images" IEEE Transactions on Pattern Analysis and Machine Intelligence, 10:910–918, November 1988; Mackworth, "Interpreting pictures of polyhedral scenes" Artificial Intelligence. 4:121–137, 1973; Waltz, "Understanding Line Drawings of Scenes with Shadows", The Psychology of Computer Vision, pp. 19–91; Straforini et al. "The recovery and understanding of a line drawing from indoor scenes" IEEE Transactions on Pattern Analysis and Machine Intelligence, 14:298–303, February 1992; Malik, "Interpreting line drawings of curved objects" International Journal of Computer Vision, 1:73–103. 1987; Hori et al., "Line drawing interpretation using probabilistic relaxation, Machine Vision and Applications", 6:100–109, June 1993; Kasturi et al., "A system for interpretation of line drawings", IEEE Transactions on Pattern Analysis and Machine Intelligence 12:978–991, October 1990.

An automatic indexing method for storage and retrieval of line drawing is illustrated in Lorenz et al., "Retrieval of line drawings", Third Annual Symposium on Document Analysis and Information Retrieval, pp. 461–468, April 1994. In this method, the graphical data is assumed to consist of individual graphical objects. This data is analyzed to locate words and some graphical primitives, namely, adjacent lines, pairs of parallel lines, concentric arcs, etc. Collections of such graphical primitives serve as indexing features. Retrieval is done using a weighted information retrieval system. Using this method, the relevant documents retrieved are those that have the same indexing features as in the query, highly weighted. The weight of an indexing feature reflects the descriptive nature of the feature and is computed from the feature frequency and the document frequency. This method is representative of approaches that also perform indexing based on content in image databases. M. Rothchild, "Dyslexic Digital Digger", B. Forbes, October 1994, pp.101–102; Pentland et al.,"Photobook: tools for content-based manipulation of image databases", IS&T International Symposium on Electronic Imaging: Conference 2185, Storage and Retrieval for Image and Video Databases, pp. 34–47, February 1994; Niblack et al., "The QBIC project: Querying images by content using color, texture, and shape", IS&T International Symposium on Electronic Imaging: Conference 1908, Storage and Retrieval for Image and Video Databases, pages 173–187, February 1993; Swain, "Interactive indexing into image databases", IS&T International Symposium on Electronic Imaging: Conference 1908, Storage and Retrieval for Image and Video Databases, pp. 95–103, February, 1993; "IBM unleashes QBIC image-content search; Queries images by color, texture, shape" in The Seybold Report on Desktop Publishing, Sep. 12, 1994, vol. 9, no.1, p.34. These methods, manually or semi-automatically, isolate the various image regions at the time of database creation. If no prior region isolation is done, then indexing can be done on only simple cues such as color (as in Swain, "Interactive indexing into image databases", IS&T International Symposium on Electronic Imaging: Conference 1908, Storage and Retrieval for Image and Video Databases, pp. 95–103, February, 1993) and not specific objects so that the indexing can yield a number of false positives.

Also of interest in this area are:

E. Grimson and T. Lozano-Perez, "Localizing overlapping parts by searching the interpretation tree" in IEEE Trans. Pattern Anal. and Machine Intell., vol.9, no.4, July 1987.

The references cited herein are incorporated by reference for their teachings.

SUMMARY OF THE INVENTION

This present invention presents a method for indexing into a database of graphical documents for graphical objects based on queries. The graphical documents are assumed to depict objects (possibly interconnected by connection lines), and annotated by text labels with the help of labeling lines. The graphical documents may be accompanied by some tabular information.

In accordance with another aspect of the invention, there is provided an automated indexing system for use with a computer implemented data base management system, for indexing documents including graphics with related text in a manner allowing querying, including:

means for receiving and storing bitmapped images;

means for processing the graphics portions of the image, to identify isolated graphics objects;

means for recognizing text characters in the bitmapped image means for relating isolated graphics objects to text associated therewith;

means for storing references to isolated graphics objects and associated text in a queryable database index, for retrieval of graphics objects and associated text upon directing a query thereto.

The automatic method of indexing graphical documents that is presented in this invention differs from prior approaches in several respects. First, it requires no prior segmentation of a graphical document into individual graphical objects, each associated with a detectable word label. The word labels are associated with nearby labeling lines and connected regions pointed to by the combination are recorded. On being given the query, these stored representations of the graphical documents are analyzed for query-specific information. Using the text information in the query, the relevant documents containing the queried object are selected. The text information is also used to approximately locate the region containing the queried object in cases where the objects in the graphical data are annotated by text labels. These regions are then grouped into subregions likely to contain single objects. If no further information is available in the query, then such regions are given as the result of indexing. If a geometric description is provided in the query, then the presence of the queried object is confirmed by using this description to recover its appearance in the isolated region. Although the indexing method described herein is primarily directed to indexing those graphical entities that are annotated by text, it can also handle un-annotated objects provided their geometric description is available. In this case, all single object containing regions become potential candidates for invoking recognition.

BRIEF DESCRIPTION OF THE DRAWINGS

These and other aspects of the invention will become apparent from the following descriptions to illustrate a preferred embodiment of the invention read in conjunction with the accompanying drawings in which.

DESCRIPTION OF PREFERRED EMBODIMENTS

Figure 2:
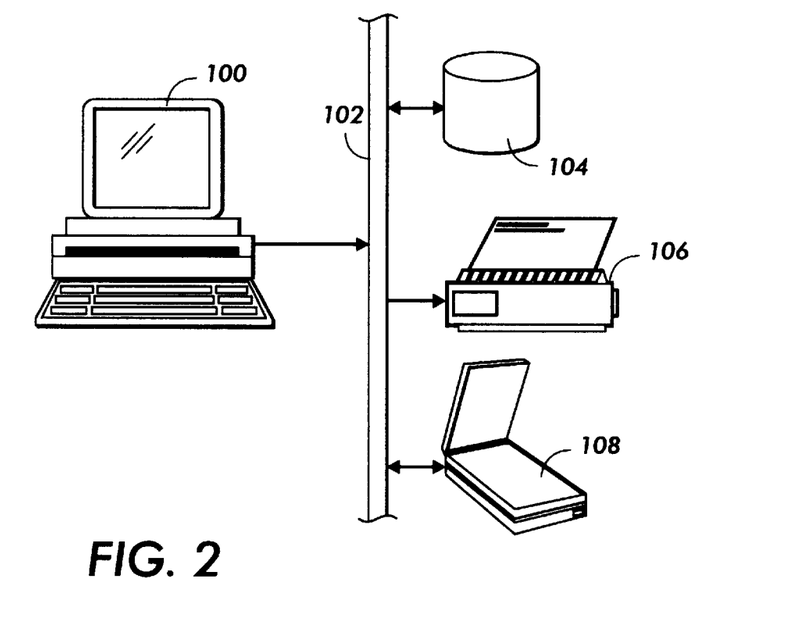
FIG. 2 illustrates a computing system useful in database retrieval applications, wherein the present invention might find particular use.

Referring now to the drawings where the showings are for the purpose of describing an embodiment of the invention and not for limiting same, FIG. 2 shows a computer workstation 100, connected via a network connection 102 to a text and graphics document storage device 104. Clearly, the databases could be installed on the workstation's own storage device, perhaps on an external drive or the like. The processing steps that will be described herein may take place either on the workstation, or at a server or processor associated with storage device 104. The computer workstation may be associated with a printing system 106 for reproduction of documents in hard copy. The computer workstation may also be associated with a scanning system 108.

Figure 1:
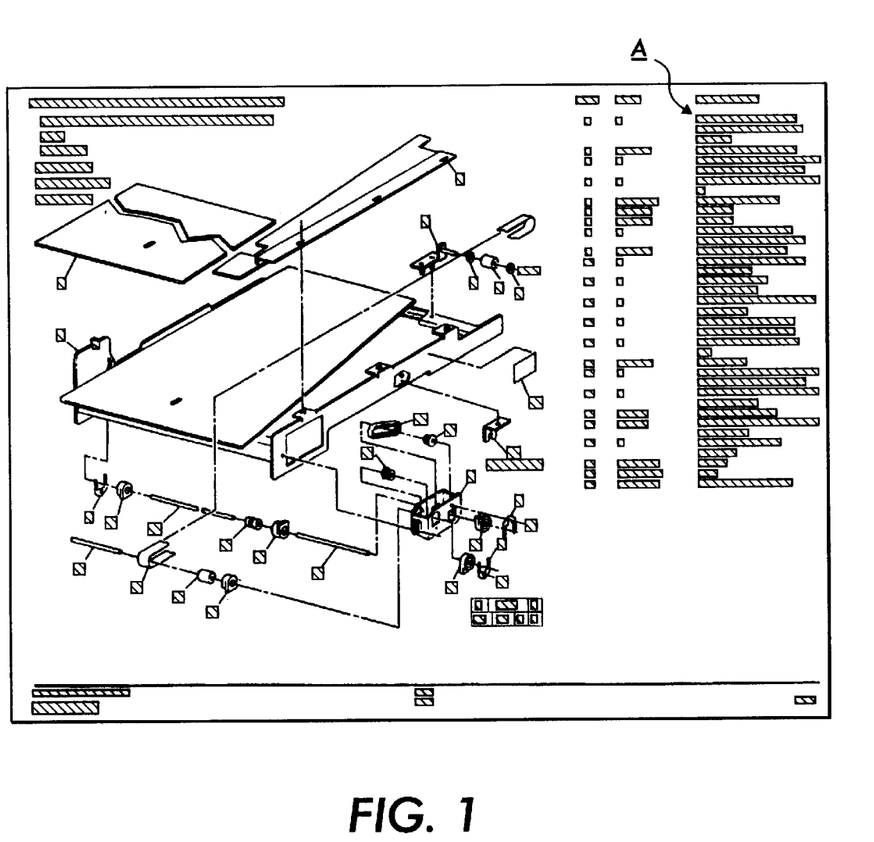
FIG. 1 is an illustrative document containing graphics, text and tabular information.

For the purposes of discussion, the combined text and graphics document image of FIG. 1 will be referenced. Such documents will typically be high resolution bitmapped images, perhaps scanned from hard copy originals, or electronically generated by well known CAD/CAM programs and/or systems. Alternatively, the documents may be stored in some other document description format, but converted for use in this system at a time prior to the processing that will be described here. The objects depicted in the graphical data could be 2-D patterns or 3-D objects.

A query is a request for reproduction of image information. While the discussion herein will be described in terms of a display arrangement, reproduction of any kind is contemplated, including printing hard copy, or storage of the query results in electronic media. The form of the query is primarily a text description of the object which can also be accompanied by a geometrical description about the appearance of the object. The queried object need not be labeled in the graphical data, and if labeled, need not have the same text label as in the text query. For domains where the object label is different from its query description (called an indirect text query, henceforth), the association between the two is assumed to be made available through Table A accompanying the graphical document, such as the one in FIG. 1, referred to as the reference table.

Figure 3:
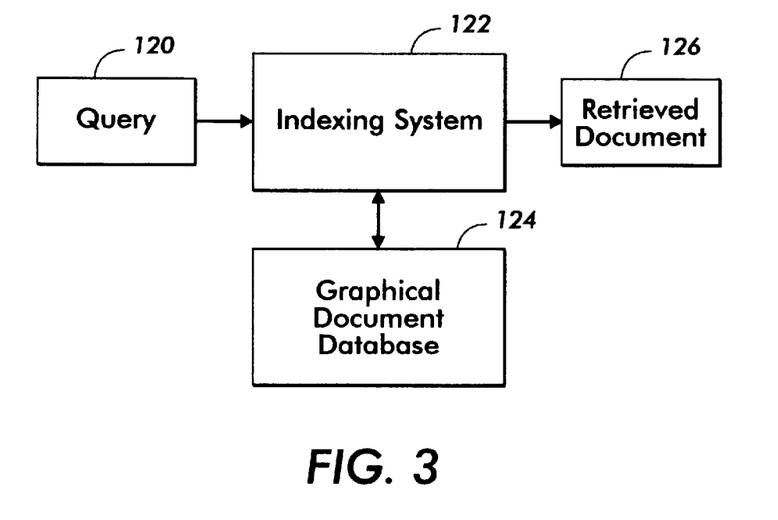
FIG. 3 schematically illustrates the indexing system in accordance with the present invention.

FIG. 3 illustrates an overview of the indexing process. Indexing of graphical documents is achieved by using information in a query 120 by an indexing system 122 to select relevant graphical documents from a graphical document database 124, and to isolate retrieved documents 126. For this, the graphical documents are analyzed to extract some general information likely to be used by several queries and stored in the database. Specifically, the graphical data is analyzed to extract the curves and junctions, lines, such as lines belonging to object contours, lines that interpret objects, i.e., that label objects, and lines that interconnect or show containment relationships (see FIG. 1 for an illustration). Since the types of these lines are not clearly deducible, it is difficult to group such lines into single object containing regions as is required for automatic indexing. The presence of annotating text can help to a large extent in roughly isolating a starting region containing a queried object. Further region isolation would require information about the appearance of the object. To index into the contents of graphical documents, therefore, it appears that we need a method that can utilize the text and graphical information in the document as well as text and geometric information in the query.

The indexing method consists of essentially two stages, namely, the database creation stage, and the indexing stage which involves text-based approximate region isolation, and geometry-based query identification. In the database creation stage shown best in FIG. 5, graphical data from graphical document image D is analyzed to extract some general representations that are likely to be used by most queries. If the graphical data is accompanied by a reference table (for example, Table A), the table is analyzed and linked to these representations. If no reference table exists, then all the annotating words are detected in the graphical data and stored in an annotating word table.

Figure 4:
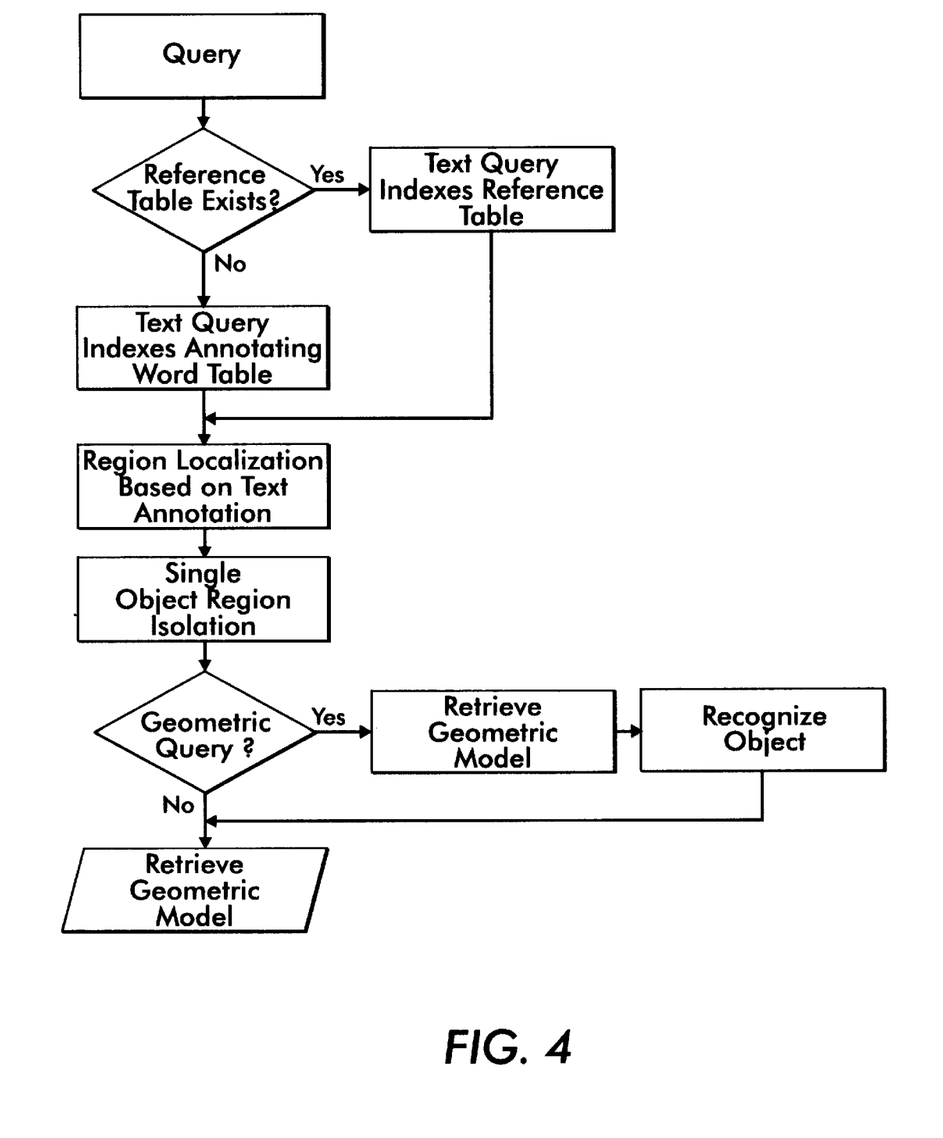
FIG. 4 is a flow chart illustrating the primary operation of the invention.

During indexing, the indexing method works as shown in the flow chart in FIG. 4. Referring back to FIG. 5, if the graphical data has reference tables (associated Table A), then a table parsing indexing process 162 searches these tables to determine relevant documents. The detected table mapping resulting therefrom is also stored to document database 124. Otherwise, the annotating tables are searched. A region pointed by the annotating text is then localized in each of the selected documents. Using the graphical information, a region likely to contain a single object is then isolated within these regions. If no geometric information is available, then these regions are the result of the indexing operation and are displayed. If geometric information is available, either in the query, or can be retrieved from a geometric database based on the query, then it is used to recognize the object in the selected regions. In that case, only those regions that contain a match with the geometric description of the queried object are given as the result of indexing.

Each of the stages in the indexing method are now described in detail.

Figure 5:
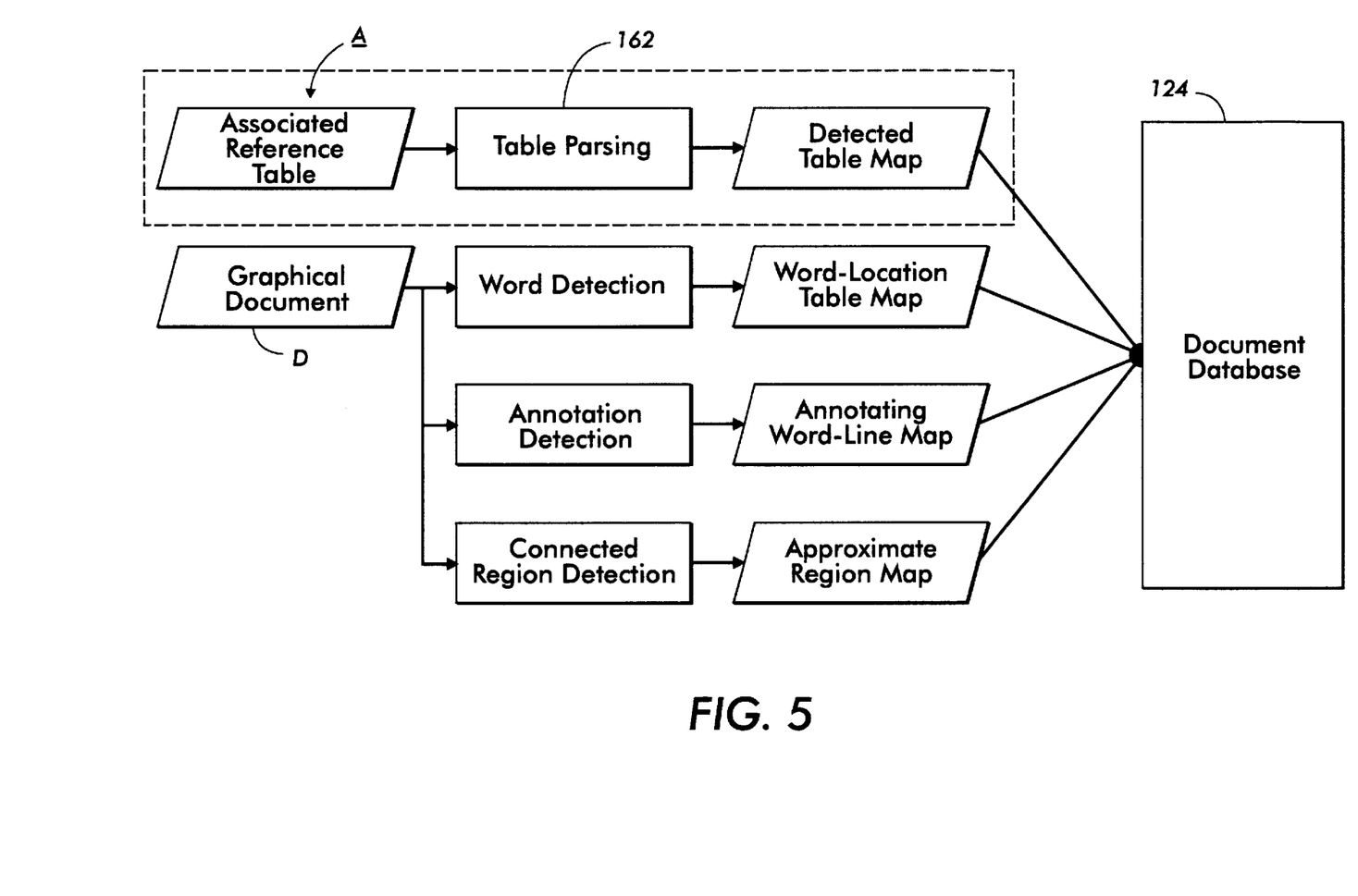
FIG. 5 is a functional block diagram illustrating the database creation function.

During the database creation stage, some general representation of the graphical documents that will be used by most queries are created and stored. These representations are used in combination with information in the query during indexing for object localization. The representations developed during database creation stage are indicated in FIG. 5. They extract the following information from the line drawing: a) Low level information about curves and junctions or connected regions; b) Lines that annotate objects in graphics (called labeling line; c) Word labels that annotate objects in graphics; d) The association of annotating word labels and labeling lines, e) Approximate regions pointed by the annotating words and lines.

Each type of data likely to be encountered and useful in response to queries will be processed. From graphical document D, a word detection process is used to generate a word location table mapping for storage at document database 124. An annotation detection process operates on document D, for detection of word lines, generating a word line mapping for storage at document database 124. A connected region detection process operates on document D, for detection of connected regions (approximate object regions), generating an approximate region mapping for storage at document database 124.

Low level processing of line drawings

The original graphical line drawing documents are assumed to be of high resolution electronic form (if they are in paper form, they are scanned using a conventional 400 dpi scanner). The first step is to thin the line drawing using a line thinning process to compactly represent the document as a binary image. Each gray pixel (a pixel defined at more than 2 levels) in the thinned image is redefined as either "ON" (has a value 1) or "OFF" (has a value 0). Line thinning processes are well known, as described for example in Pavlidis, Algorithms for Graphics and Image Processing. Rockville: Computer Science Press, 1982, incorporated herein by reference.

Next, curves are extracted from the line drawing by tracing out a sequence of on-pixels between junctions (junctions are pixels with more than two on-pixels as neighbors). Although any curve detection process could have been used, the following was used.

The basic idea behind curve generation was to initially assign all "on" pixels to separate curves and then shrink the set of curves by merging adjacent "on" pixels. The process involves the following steps:

1. Each "on" pixel $P(i,j)$ is given a separate curve identification number $C_{ij}$.
2. For all "on" pixels $P(i,j)$ in the image, do the Steps A and B Step-A Find the number of "on" neighboring pixels $P(i',j')$ in an eight pixel neighborhood (defined by $|i-i'| \leq 1$ and $|j-j'| \leq 1$) that are not junctions. Let their parent curves be denoted by $C_{i'j'}$.

Step-B

If the number of "on" neighboring pixels is 1 or 2, the curve $C_{ij}$ is merged with the curves $C_{i'j'}$.

3. The points along the curves are traced in order. Adjacent junction nodes are merged into a single junction. The end points of curves are extended so that all curves emanating from the merged junctions now emanate from the single junction.

4. Circularity of curves is recorded.

A data structure called the union-find data structure was used to implement Steps 1 and 2 so that these steps could be performed in time linear in the size of the image. The other steps similarly are also linear time operations.

Junctions (points from which at least two curves originate) in the line drawing are then recorded. The curves are further processed to extract line segments using a line segment approximation based on recursive split and merge process described in Pavlidis, Algorithms for Graphics and Image Processing. Rockville: Computer Science Press, 1982 with the distance from line and length of line as thresholds for line approximation. Depending on the thresholds used, fine or coarse line approximations can be generated. For single object region isolation during indexing though, a unique representation of a curve in terms of lines is needed. For this, another line approximation called the "curvature-based line approximation" is obtained as follows:

1) Points along the curve are successively examined and places where the curvature changes from positive to negative and vice versa are recorded. The positive or negative curvature is determined depending on whether the next point in curve ordering is turned clockwise or anticlockwise from the current point. For faster operation this step is done using the line approximation to the curves. A zero crossing is said to have occurred when such a curvature change occurs. This step divides the curve into zero-crossing segments, i.e. with end points being the zero-crossings.

2) A single point on the curve is chosen within each zero-crossing segment determined in Step 1. This point is chosen to be maximally away from the end points of the zero crossing segment.

3) The points chosen in Step-2 are joined to form the curvature approximation.

As a result of curve extraction and junction identification, a graph description of the line drawing is created with the junctions serving as nodes of the graph, and the curves being the edges of the graph.

Figure 6:
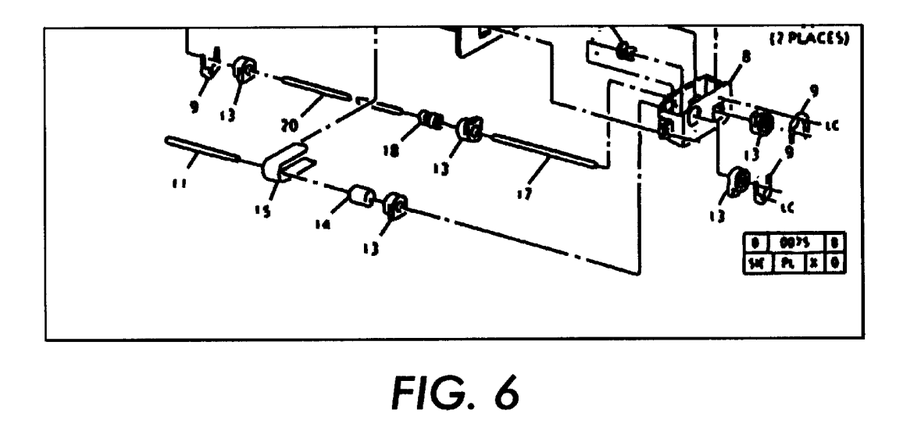
FIGS. 6, 7 and 8 illustrate a the image processing required for images to be processes in accordance with the invention.
Figure 7:
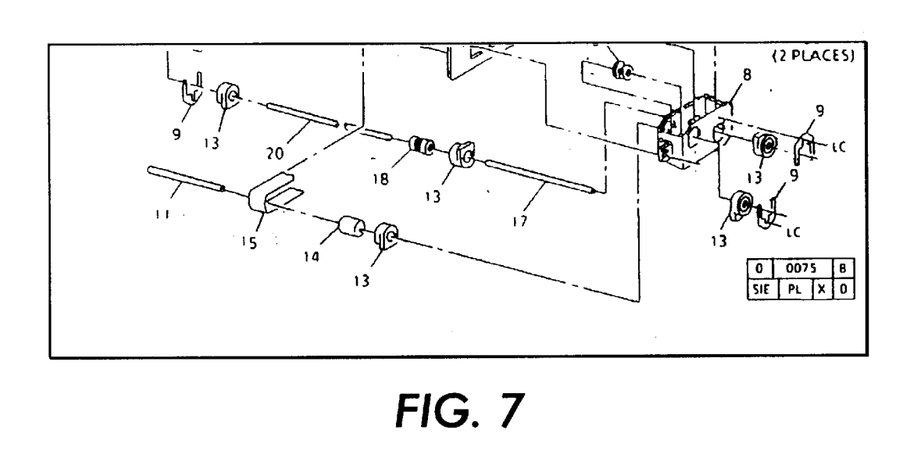
Figure 8:
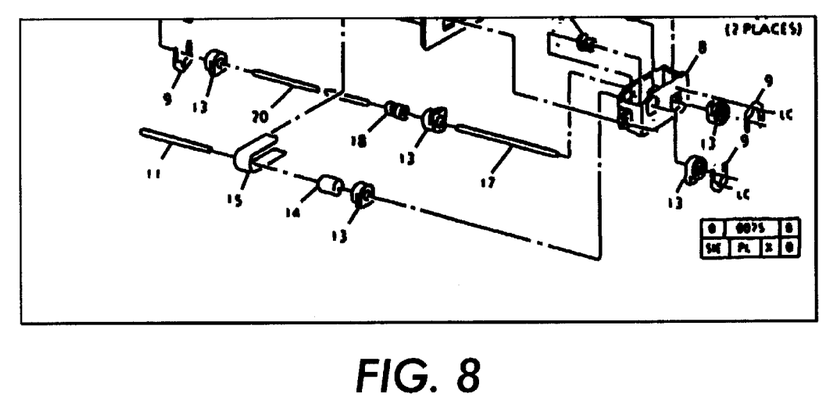

FIG. 6 shows a scanned high resolution line drawing image. FIG. 7 shows the results of thinning. FIG. 8 shows the curve representation of the image. As can be seen, the information in the line drawing image is fairly well-preserved in these representations.

Detection of labeling lines

Figure 9A:
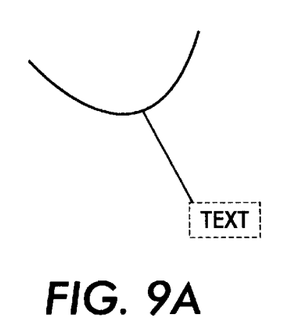
FIGS. 9A, 9B, and 9C illustrate lead line distinctions necessary for understanding lead line processing.
Figure 9B:
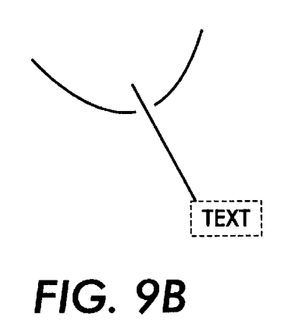
Figure 9C:
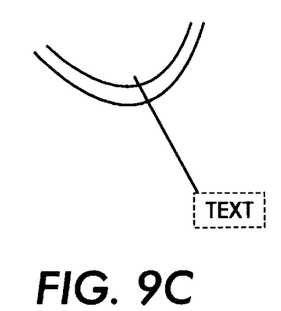
Figure 10:
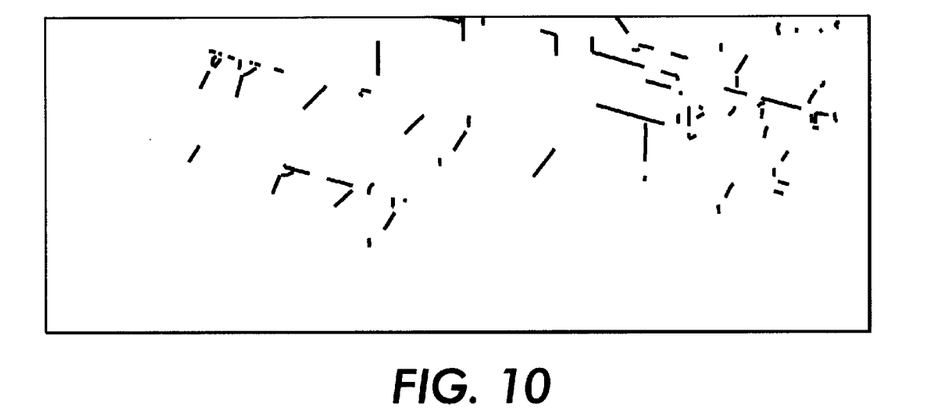
FIGS. 10, 11, 12 and 13 illustrate identification and isolation of image information in accordance with the invention.

The curves that label graphical objects in the line drawing (called "labeling lines" henceforth) could be of several types. Three such types can be detected in the method used to create the image. The labeling lines are either straight lines or curves with few straight segments. They often form a T junction with the contour of the object being labeled as shown in FIG. 9A. Sometimes, they are drawn so as to not overlap with the object contour, so that they are shown as passing through as in FIG. 9B. Finally, the lines that label parts may pass through several other objects before ending in the actual object being labeled as shown in FIG. 9C. In all the three cases, however, they must be relatively near an annotating text While this distance may be variable, our embodiment used 10 pixels as a threshold. Our method of detecting labeling lines uses the graphical constraints to first identify potential labeling lines. Then potential annotating words are detected. Finally, the candidate lines that have an associated annotating word are retained as labeling lines. The graphical constraints require that labeling lines be either straight lines or curves consisting of at most three lines. They require one end of the curve to be open (i.e. not near any junction), and the other end of the curve to either (1) end in a T junction, or (2) be open but have the curve pass through a gap near the end. A curve is said to pass through a gap if the join of the end points of two other curves intersects within the curve. Due to noise in imaging, curves that fall short of forming a T junction within a few pixels are also allowed. Similarly, in determining that the curve is open at the other end, free space is detected beyond a few pixel neighborhood. The candidate lines thus obtained contain few false negatives. That is, most of the real labeling lines are captured in this step. However, there may be a number of false positives. This is illustrated in FIG. 10 which depicts the candidate labeling lines detected in the line drawing of FIG. 8.

Detection of word labels

Figure 11:
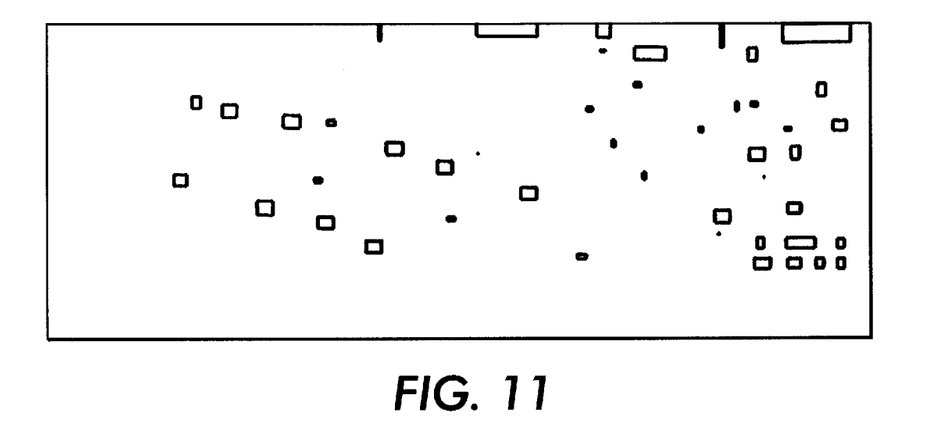

To detect words in the line drawing, any OCR process may be used. This detects all word labels, including those that annotate graphical objects. This can be seen in FIG. 11 which shows the result of word block detection in the line drawing of FIG. 8. The detection of the text within the word boxes can be done using any existing OCR software. We chose a version of Xerox Corporation's TEXTBRIDGE software in our implementation.

The detected words in the word boxes are recorded in a table called the word location table and are used to select the relevant document during indexing.

Association of annotating words and lines

Since the actual labeling lines must be associated with annotating words and vice versa, the candidate labeling lines were paired with the detected words using a method that determines the best matching in a bi-partite graph. To see the connection between this association and the bipartite matching problem, the concept of matching in bipartite graph is described below. A bipartite graph is an undirected graph $G=(V,E)$ in which V can be partitioned into sets $V_1$ and $V_2$ such that an edge $(u,v) \in E$ implies either $u \in V_1$ and $v \in V2$ or $u \in V_2$ and $v \in V_1$. In other words, a bi-partite graph is a graph whose nodes can be partitioned into two subsets such that the edges go only across the subsets. A matching in an undirected graph $G=(V,E)$, is a subset of edges $M \subset E$ such that for all vertices $v \in V$, at most one edge of M is incident on v.

By making the candidate labeling lines and the words as the two subsets of a bipartite graph, a pairing of a candidate labeling line with a word label becomes an edge in this graph. Since an annotating word (labeling line) should be associated with only one labeling line (annotating word), the result of determining the association between word labels and the candidate labeling lines can be seen as a matching in a bi-partite graph.

Each edge between the nodes is labeled with the nearest distance between the word label location and the candidate labeling line. This distance is chosen to be the smallest of the distances between the four corners of the rectangular bounding box of the word label and the open end of the labeling line. The "best" matching was determined to be the one which paired the nearest set of nodes. This is determined by the following process:

1) Pick the least cost edge of the bipartite graph.

2) Delete all edges emanating from both the word label and the candidate labeling line associated with this edge and record their association.

3) Repeat the above steps until no more edges remain in the bi-partite graph.

Figure 12:
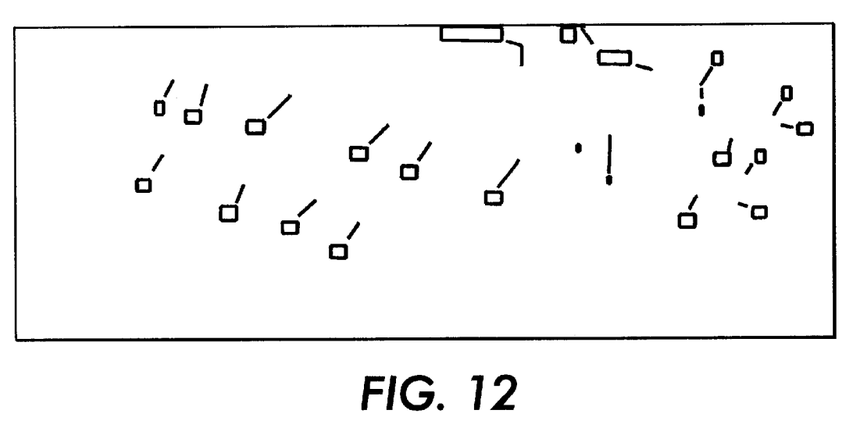

The set of labeling lines and their associated word labels retained using the above process are stored in the database as one of the representations of the line drawing. In such representations, the detected text in the retained word labels are also noted. The retained associations for the image of FIG. 8 are shown in FIG. 12.

Approximate regions pointed by the annotating words

To obtain the approximate regions pointed to by the annotating words, connected regions of curves are first obtained. The connected regions of curves are determined using a connected component process that is similar to the process described in the Low level line processing section. First, all the curves are kept in separate regions. Then regions of curves meeting at a junction are all merged into a single region. This proceeds until no more regions can be merged (when all junctions are examined). Such connected regions, however, need not always contain a single object as in FIG. 13 which shows some connected regions in the line drawing of FIG. 8. The connected regions are associated with the appropriate labeling lines, whenever they exist. Such labeling lines would either intersect or cross a gap in a contour of the connected region.

Extension to handle scanned tables associated with graphical data

To handle applications where the annotating text in the graphical data is not directly used in the query, we assume that a reference table listing the association of queried text to annotated text, is provided. This table, if already available in electronic form, can be easily indexed using the text query by conventional string matching techniques. But if the tables are in paper form, they need to be scanned in and a recognition of the table has to be done. The following section describes the method used to recognize the reference table during database creation. These tables are then linked to the annotating word table of the associated line drawing and stored in the database.

Table recognition on the scanned table

In some applications, the objects in the graphical data may not be queried using the same annotating text that is associated with the objects in the graphical data. This could happen, for example, in the domain of technical manual documents, because the same object may occur in several subassemblies, and may be annotated by different label numbers in each such subassembly drawing. In such a case, however, a reference table usually accompanies the line drawing as shown in FIG. 1. The reference table links the annotating label of the object to its other descriptions, e.g. the name of the object, than can be used in the query for indexing. A table recognition process was designed to interpret the reference table to handle such applications. The basic idea is to detect words in the reference table using standard OCR software and parse them as words in rows and columns using the syntax of the table. Since the syntax is assumed to be a context free grammar, any standard parsing process for such grammars can be used. The context free grammar and the parsing process we used are now described.

The following context free grammar describes reference tables of the type shown in FIG. 1:

Table→(<row$_1$><row$_2$*>) +
<row$_1$>→<col$_1$><blank><col$_2$><blank><col$_3$>
<row$_2$>→<blank><blank><col4 >
<blank>→<blank*>| blank symbol
<col$_1$>→<number>
<col$_2$>→<number>|
<col$_3$>→<word+>
<col$_4$>→<word+>| <word>(P/O <word +>)
<number>→digit+|digit
<word>→<char-digit+>
<char-digit>→char | digit
char →A|a|B b . . . Z|z
digit →0|1|2 . . . |9

Here the enclosing brackets <. . . >denote a non-terminal of the grammar. The unenclosed variables denote terminals. The * symbol indicates zero or more occurrences of the variable while the symbol + indicates one or more occurrences of the variable.

According to the above syntax, the table is a sequence of rows of two types. The first type of row consists of three columns, with the first column giving the text label of the graphical object (a machine part) in the graphical data, and the second column and third column indicating the part number and part name description of the object respectively. If there is no part number, the second column may indicate a "- - -". The description of the object could span more than one row (as for BOTTOM TRANSPORT ASSEMBLY, in FIG. 1). This is captured by a second type of row (row2) that has blanks in the first two columns and the part description in the third column. The part description could be the continuation of the part name from the previous row (e.g. GEAR HOUSING DRIVE PULLEY may be split up as GEAR HOUSING on the first row followed by DRIVE PULLEY on the second row), or it could be additional description referring to the containing item (such as (P/O item 1)).

The parsing process parses the detected words in the reference table using the above grammar by grouping them to correspond to the entities (terminals and non-terminals) in the grammar. The interpreted table is then stored in the database.

Summary

The line drawing at the end of database creation stage is stored in the form of the following representations: (1) Connected regions pointed by labeling lines and annotated text. (2) Annotating word table. (3) Reference table linked to annotating word table whenever it exists. It can be shown that the process used for creating these representations are fast, and mostly linear in the size of the image.

Query-text-based relevant document and approximate region selection

Relevant document selection

The text information in the query is used to select the relevant document containing the queried object as well as an approximate region containing the queried object as follows. To select the relevant documents, the associated annotating word or reference tables with the documents are indexed and those with a match are recorded. The associated line drawing representations are then chosen as relevant graphical documents. The indexing into the table is done using a string matching process that operates on the individual columns of the table and requires an exact length matching string (i.e. beginning and ending with the words in the query) to be found. This process allows for some common errors in character recognition, such as the fact that an i or l could be confused with a 1, an O with a 0, etc. This is done by grouping the characters that can be confused into confusion equivalence classes. The matching process then allows a match only when the mismatch with the query string is due to elements belonging to confusion equivalence classes. The exact matching length constraint ensures that two queries such as "drive belt" and "drive belt assembly" will find matches in different entries. In the case of matching in the annotating word table, if a match for the text query is found in a column in the table, the associated representation depicting the connected region pointed by the annotating word can be retrieved. If a reference table is used, then if a match is found in the table, then the annotating word for the query is recovered from the corresponding column in the reference table (as determined from the table syntax). Using this annotating word, the associated line drawing representation can be recovered by indexing into the annotating word table.

Approximate region localization using text query

Figure 13:
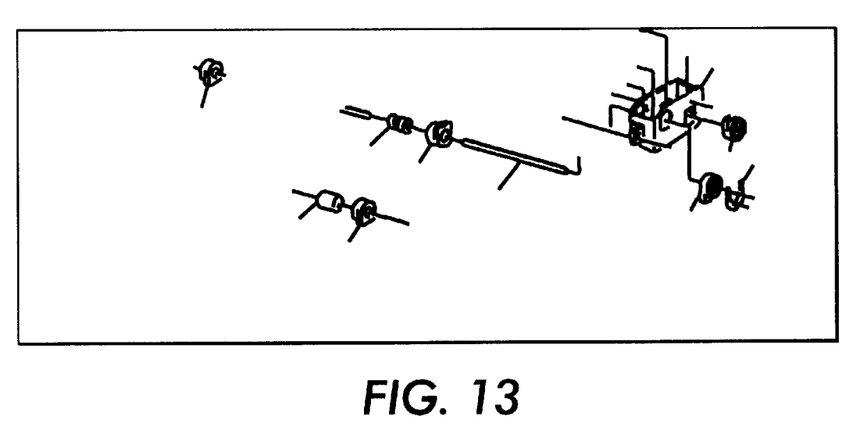

Using the line drawing representation depicting the connected regions pointed by annotating words obtained as a result of the table indexing operation above, the relevant connected regions pointed by the annotating words corresponding to the query are isolated. FIGS. 8 and 13 shows the isolation of such connected regions for the query "bearing block" whose annotating text label is detected to be "13" using the reference table and the line drawing depicted in FIG. 1. As can be seen, all the regions containing the queried object are approximately localized during this operation.

Geometry-based query identification

The text information can only approximately localize a region containing the queried object. As shown in FIG. 13, such regions may contain contours of other objects besides the queried object, and in some worst cases could potentially span the entire line drawing. Further restriction of the region containing the object needs to be done for indexing. For this we used a method for performing single object region isolation within connected regions.

Single object-containing region isolation

The initial connected region obtained by using text for indexing contains lines that belong to object contours (called object lines) and lines that interconnect objects (called interpretation lines). The mechanism for isolating a region containing a single object exploits the observation that unlike the interpretation lines, the object lines have a valid 3 D interpretation as bounding contours of surfaces of a 3 D object, to derive a way to distinguish between these lines. It assumes that the objects in line drawings are tri-hedral or curved with at most three surfaces meeting at junctions. For such objects, object lines can either be labeled as convex (+), concave (−), or boundary (>,<) lines. A new line label called the i-label is introduced and a new set of junctions is derived that captures the intersection of interpretation lines with object surfaces and contours (in their 2 D projection). The junctions in the line drawing are then extracted and the new junction constraints are propagated using a relaxation process to consistently label all the lines. The regions belonging to objects are obtained by discarding all the lines with the i-label that are not part of a consistent global interpretation, and grouping the remaining object lines into connected components or regions. Unlike existing grouping methods, this method is guaranteed to be reliable, i.e., the region isolated comes from single objects. The process can also handle the labeling of curved objects by using the curvature-based approximation previously described.

This method of region isolation can also be applied to noisy line drawings that show broken contours, and can reliably isolate regions containing a single object.

Recognition of objects in the selected regions

In the absence of any further geometric information in the query, the result of single object region isolation described above can be taken as the result of indexing. If a geometric description of the queried object is available, however, it can be used to identify the object in the region. In general, an object can be identified using either geometric or qualitative methods, and we chose the former. In geometric methods, the object is described geometrically as a set of features, such as points (corners) or lines. Then, a match is found between such features on the model and the image. The match establishes a pose for the object in the image coordinates. This can be used to project the model into the image and the correctness of the pose can be confirmed by a detailed examination of the image area accounted by the projected model.

For this, a 3 D model (2 D objects can be similarly handled) of the queried object must be supplied. This is usually available as CAD data. Curves and lines are detected on the model using the previously described process. Corners are then extracted at points in curves where the angle of turn is beyond a certain threshold (15 degrees). Corners and lines serve as features for matching the object model. Such features are similarly identified in the isolated image region. A geometric model-based object recognition method was used to recognize the presence of the queried object in the graphical data. Ullman et al., "Recognition by linear combination of models" IEEE Transactions on Pattern Analysis and Machine Intelligence, pages 992–1006, October 1991. Briefly, this method states that four sets of matching features between the model object and the image determine the pose of the object up to an affine transform. The four matching features were searched using an interpretation tree as described in E. Grimson and T. Lozano-Perez, "Localizing overlapping parts by searching the interpretation tree" in IEEE Trans. Pattern Anal. and Machine Intell., vol. 9, no.4, July 1987. This process essentially examines 4 tuples of matching features and removes those that do not satisfy some unary and binary constraints. A bound on the allowed variation in the angle of the corner was used as a unary constraint, while the orientation of the corner bisectors was used as a binary constraint. The pose was verified using a Hausdorff distance-based metric. The object was verified when a suitable pose could be found so that the model contours projected using the computed pose matched to the image region contours. If a match is found, then the region of match with the projected model is given as the result of indexing.

While the matching technique is conventional, a new verification algorithm was developed which is now described.

The verification process uses a distance measure called the Hausdorff distance, between the projected model and image points. Unlike other methods that use the Hausdorff distance, the verification process merely checks to see if it exceeds a chosen verification threshold, thus enabling fast verification. See, D. P. Huttenlocher et al. Comparing images using the hausdorff distance. IEEE Transactions on Pattern Analysis and Machine Intelligence, 9:850–863, September 1993. The Hausdorff distance between a set of points is defined as follows:

Given two finite point sets $A=a_1, a_2, \ldots a_p$ and $B=b_1, b_2, \ldots bq$, the Hausdorff distance is defined as $$H(A,B)=\max (h(A,B), h(B,A))$$

where $$h(A,B)=\max_{a \in A} \min_{b \in B} \|a \sim b\|$$

and $\|.\|$ is some underlying norm on the points of A and B. The function $h(A,B)$ is called the directed Hausdorff distance from A to B. It identifies the point a in A that is farthest from any point of B and measures the distance from a to its nearest neighbor in B. Intuitively, if $h(A,B)=d$ then each point of A must be within distance d of some point of B, with at least one point in A that is exactly at distance d from its nearest point in B.

For purposes of verification, the Hausdorff distance serves as a measure of mismatch between the projected model (set A) and underlying image features (set B). The computation of the Hausdorff distance, however, can be expensive as all pairs of features have to be examined. To rule out the bad matches, it is sufficient to check if the Hausdorff distance exceeds a certain threshold. Thus if the Hausdorff distance exceeds a threshold of say d=20 pixels, then we know that that is a bad match. Such a determination can, however, be made without computing the Hausdorff distance completely. The new verification method, therefore, exploits the observation that if no image point is found within a circle of radius d around a projected model point, then the directed Hausdorff distance will also exceed d. Actually, the verification process checks for model to image and vice versa to account for occlusion and scene clutter. That is, it looks at the projected model and image points in the rasterized arrays and checks to see if no image point is found within the d radius circle of the projected model point, and conversely, no projected model point is found within d radius circle of an image point.

Indexing System

Figure 14:
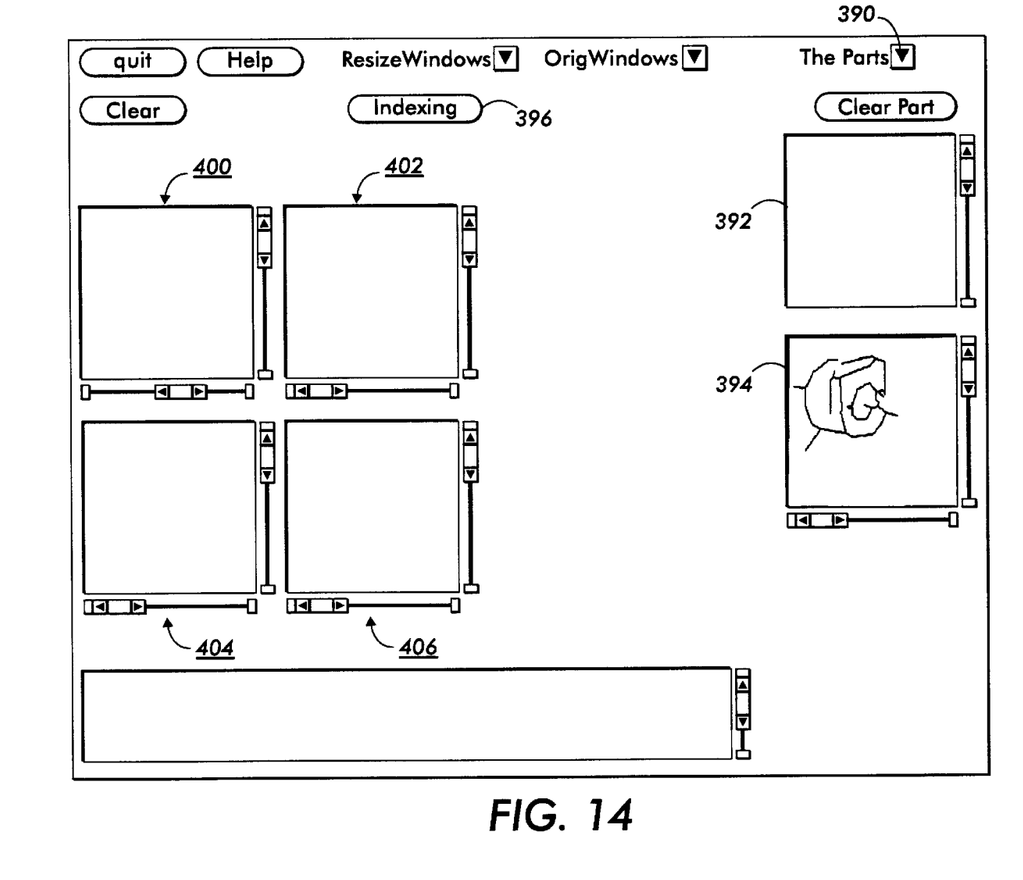
FIG. 14 illustrates a user interface that might be used in association with the indexing system.

The indexing is implemented through a user interface shown in FIG. 14. For this, the user selects a part for querying by clicking on a part list button 390 which give a listing of parts in a listing window 392. When a part name is chosen, the relevant geometric description is reverted from the part database and shown in the part description window 394. When the indexing operation is invoked using the indexing button 396, the first four images containing the object are retrieved from the database and shown in four windows 400, 402, 404, 406. The system can locate objects even if they are in different poses, a point that makes this indexing system different from others.

Summary

In this invention, we have presented a method for indexing graphical documents based on text and graphical content. The method can isolate graphical object-containing regions using information in the query. It can handle graphical data depicting annotated graphical objects. The annotation is assumed to be done via a combination of text labels and labeling line pointing to the object region. The graphic lines in the data are assumed to consist of lines belonging to object contours and lines for interconnecting, and interpreting objects. It can handle both direct and indirect textual queries about graphical objects. In the case of indirect textual queries, a reference table associating the query names to annotating labels is assumed to be provided. The indexing operation uses the text part of the query to quickly and roughly localize the region containing the object, while geometric information is used to further localize and confirm the presence of the object.

The indexing method can also be used for indexing un-annotated objects in graphical data. In such cases, the method for single object-containing region isolation described can be used on all the connected regions in the line drawing to generate candidate regions for any query. This may, however, considerably affect the speed of indexing. In fact, the performance of indexing is affected by the amount of information present in the query and the graphical data. Thus the search for the query is faster if it is annotated by text labels. If only text information is present in the query, then the indexing method selects single object-containing region pointed to by the annotating text label. If only geometric information is present or the part is not annotated in a drawing, then the indexing method examines all single object-containing regions for object recognition.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. An automated indexing system for indexing documents, which include graphics having associated text labels, in a manner allowing object querying within said documents, comprising:

a microprocessor for:
 a) processing graphic portions of a document and identifying isolated graphic objects within said graphic portions;
 b) recognizing text labels in said graphic portions;
 c) relating said isolated graphic objects to text labels associated therewith; and a database for storing references to said isolated graphic objects and said text labels associated therewith in a queryable database index of said database, for independent retrieval of said isolated graphic objects and said associated text labels upon directing an independent query thereto.

2. A method of processing a document containing graphics and text for use in an indexing system associated with a computer implemented database management system, wherein:

a bitmapped image containing graphic portions further comprised of isolated graphic objects having associated text labels is received and stored;

said bitmapped image is processed to identify said isolated graphic objects and to identify and recognize said text labels therein;

said text labels and said isolated graphic objects are associated;

references to said isolated graphic objects and said associated text labels are stored in a queryable database index, for retrieval of graphic objects and associated text upon directing a query independently thereto.

3. The method as described in claim 2, wherein said processing of said bitmapped image to identify said isolated graphic objects therein includes identifying groups of graphic objects connected to said isolated objects within said image.

4. The method as described in claim 2, wherein said association of said text labels and said isolated graphic objects includes identifying lead lines associated with said text labels, each lead line having a text end and a pointing end; and identifying isolated graphic objects near said pointing end of said lead lines, whereby said isolated graphic objects near said pointing end of said lead lines are associated with said text characters at the end of said lead line.

5. An automated image indexing system for indexing graphical objects within graphical portions of documents in a manner allowing querying for said objects independently of said graphical portions, comprising:

means for processing graphic portions of documents into isolated connected graphical regions;

means for approximately localizing queried graphical objects by associating existing annotating text words with said connected graphical regions; and means for automatically isolating single graphical objects from said connected graphics regions.

6. The system of claim 5 further comprising a means for verifying a match to posed queries using visual object recognition by matching object features from said posed queries with stored geometric models representing said objects.

7. The system of claim 5 further comprising a means for recognizing annotating text words in bit-mapped line-drawing images.

8. The system of claim 7 further comprising a means for forming data representations in a database management system using feature maps extracted from said line-drawing images.

9. The system of claim 8 further comprising a means for verifying a match to posed queries using visual object recognition by matching object features from said posed queries with stored geometric models representing said objects.

10. The system of claim 7 further comprising a means for verifying a match to posed queries using visual object recognition by matching object features from said posed queries with stored geometric models representing said objects.

11. The system of claim 7 wherein said graphical documents have associated text tables which are used for indexing said graphical documents.

12. The system of claim 11 further comprising means for receiving queries and suitably transforming them for indexing.

13. The system of claim 5 further comprising a means for recognizing annotating text words in bit-mapped line-drawing images.

14. The system of claim 13 further comprising means for receiving queries and suitably transforming them for indexing.

15. The system of claim 14 further comprising a means for verifying a match to posed queries using visual object recognition by matching object features from said pose queries with stored geometric models representing said objects.

16. The system of claim 5 wherein said graphical portions of said documents have associated text tables related to said graphical, said system further comprising:

means for receiving queries and transforming them for indexing;

means for recognizing annotating text words in bit-mapped line-drawing images;

means for forming data representations in a database management system using feature maps extracted from said line-drawing images; and means for verifying a match to posed queries using visual object recognition by matching, using said feature maps, object features from said posed queries with stored geometric models representing said objects.

* * * * *